(12) United States Patent
Tanaka (10) Patent No.: US 10,454,126 B2
(45) Date of Patent: Oct. 22, 2019

(54) CLAMP ASSEMBLY FOR A FUEL CELL STACK AND A METHOD OF ASSEMBLING A FUEL CELL STACK

(71) Applicant: UNIVERSITY OF CAPE TOWN, Cape Town (ZA)

(72) Inventor: Shiro Tanaka, Cape Town (ZA)

(73) Assignee: UNIVERSITY OF CAPE TOWN, Cape Town (ZA)

( * ) Notice: Subject to any disclaimer, the term of this patent is extended or adjusted under 35 U.S.C. 154(b) by 465 days.

(21) Appl. No.: 15/039,473

(22) PCT Filed: Oct. 28, 2014

(86) PCT No.: PCT/IB2014/065662
§ 371 (c)(1),
(2) Date: May 26, 2016

(87) PCT Pub. No.: WO2015/079345
PCT Pub. Date: Jun. 4, 2015

(65) Prior Publication Data
US 2017/0025701 A1    Jan. 26, 2017

(30) Foreign Application Priority Data
Nov. 26, 2013 (GB) .................................. 1320838.4

(51) Int. Cl.
*H01M 8/248* (2016.01)

(52) U.S. Cl.
CPC .................................. *H01M 8/248* (2013.01)

(58) Field of Classification Search
CPC .................................................. H01M 8/248
See application file for complete search history.

(56) References Cited

U.S. PATENT DOCUMENTS 5,543,241 A * 8/1996 Nishioka ............. H01M 8/0271
                                                     429/458
6,720,101 B1 * 4/2004 Dong .................. H01M 8/2475
                                                     429/435
(Continued)

FOREIGN PATENT DOCUMENTS

JP    2010198861 A    9/2010
JP    2012028194 A    2/2012
(Continued)

OTHER PUBLICATIONS

Machine translation of KR-20070036485-A (Year: 2007).*

*Primary Examiner* — Robert S Carrico
(74) *Attorney, Agent, or Firm* — Fay Sharpe, LLP (57) ABSTRACT

A clamp assembly for securing a fuel cell stack arrangement in a compressed condition. The stack includes an electrode assembly interposed between upper and lower current collectors, supportable between upper and lower endpiate structures. It comprises at least one rigid clamping device comprising spaced apart transversely disposed elongate clamp members for engaging outer surfaces of the upper and lower endplates respectively along peripheral edges, the clamp members being interposed by vertically disposed support members having a length greater than the height of the stack in a compressed condition thereof. The endpiate structures define docking formations along peripheral edges for engaging the damp members under compression of the stack. The docking formations define spaces between the endpiate structures and the compressing means within which the clamp members are receivable during compression. Upon release of compression, the clamp members remain captively engaged within the docking formations against recoil pressure of the stack.

17 Claims, 6 Drawing Sheets

(56) References Cited

U.S. PATENT DOCUMENTS

| | | | | |
|---|---|---|---|---|
| 2003/0203269 A1* | 10/2003 | Rock | .................... | H01M 8/2475 429/535 |
| 2004/0115513 A1* | 6/2004 | Yang | .................. | H01M 8/0258 429/457 |
| 2005/0064270 A1* | 3/2005 | Marianowski | ...... | H01M 8/0206 429/434 |
| 2005/0282060 A1* | 12/2005 | DeFillippis | ......... | H01M 8/0258 429/447 |
| 2006/0286426 A1* | 12/2006 | Kikuchi | ............. | H01M 8/0234 429/429 |
| 2007/0052390 A1* | 3/2007 | Kim | .................... | H01M 2/1016 320/116 |
| 2010/0098978 A1* | 4/2010 | Hafemeister | ..... | H01M 8/04052 429/439 |
| 2010/0255401 A1* | 10/2010 | Lee | ...................... | H01M 8/248 429/467 |
| 2011/0003230 A1 | 1/2011 | Ozgur | | |
| 2011/0151312 A1* | 6/2011 | Kim | ....................... | H01M 6/46 429/156 |
| 2014/0113171 A1* | 4/2014 | Schaefer | ............ | H01M 2/1077 429/120 |

FOREIGN PATENT DOCUMENTS

| | | | |
|---|---|---|---|
| JP | 2012181996 A | | 3/2012 |
| KR | 20070036485 A | * | 4/2007 |

* cited by examiner

CLAMP ASSEMBLY FOR A FUEL CELL STACK AND A METHOD OF ASSEMBLING A FUEL CELL STACK

FIELD OF THE INVENTION

This invention relates to a clamp assembly for clamping fuel cells together in stacked relation. More particularly, the invention relates to a clamp assembly for securing a stack of fuel cells together in a compressed condition at a predetermined pressure.

BACKGROUND TO THE INVENTION

Fuel cells convert chemical energy from fuels such as hydrogen into electricity through a chemical reaction with an oxidizing agent. The cells are generally comprised of three adjacent parts, an anode, an electrolyte and a cathode and two chemical reactions occur at the interfaces of these parts. Generally, as a result of the chemical reactions, fuel is consumed and water and an electric current are created.

It is well known that a plurality of fuel cells may be stacked together in order to increase power output. However, in order to achieve optimal power output, fuel cell stacks are heavily compressed to reduce contact resistance between cell components, thereby reducing the amount of electricity dissipated as heat. In order to fasten a fuel cell stack generally two end plates are used to maintain an optimal contact pressure between the interfaces of the fuel stack assembly. Proper contact pressure is required to both increase energy efficiency by reducing ohmic loss and prevent leakage of fluid. With regard to increasing energy efficiency, it is important to increase the surface area of the fuel cell as much as possible.

Also, fuel cells generally operate at high temperatures which may result in the dimensions thereof changing as the cells become active.

Clamping devices for securing fuel cell stacks under compression are known in the art. Japanese patent no. JP 2012-028194 (to Honda) discloses a fuel cell stack having first and second endplates disposed on either side of the stack. The endplates are clamped by means of a fastening member generally defining a cantilever shape which is inefficient for maintaining axial compression pressure.

Japanese patent no. JP2012-181996 (to Nissan) also teaches of a clamping device for a fuel stack. As with the Honda patent, the clamping device employs a cantilever shape which is inefficient in maintaining compression across the surface area of the fuel cell stack.

Japanese patent no. JP2010-198861 (to Panasonic) describes a cell pressing assembly which uses pre-compressed springs located within a rigid frame to exert pressure on cell elements. The assembly utilizes bolts to secure the spring elements in a compressed state which need to be removed to allow the springs to expand once inserted into the rigid frame. The need to remove the bolt elements renders is time consuming and it is difficult to re-set tension in response to creeping of the stack components in use.

OBJECT OF THE INVENTION

The object of this Invention is to provide a clamp assembly for a fuel cell stack which will at least partially alleviate the above problem and provide the advantages indicated above.

SUMMARY OF THE INVENTION

Aspects of the invention are set out in the independent claim and preferred features are set out in the dependent claims.

There is described herein a clamp assembly for securing a fuel cell stack arrangement in a compressed condition following compression thereof using a compressing means, wherein the fuel cell stack arrangement generally includes at least an electrode assembly interposed between an upper current collector and a lower current collector, supportable between operatively upper endplate and lower endplate structures, the clamp assembly comprising:

at least one generally rigid clamping device, the clamping device comprising spaced apart operatively transversely disposed elongate clamp members for engaging outer surfaces of the upper and lower endplate structures respectively along generally peripheral edges thereof, the elongate clamp members being interposed by generally vertically disposed support members in which the length of the support members is greater than the height of the fuel cell stack arrangement in a compressed condition thereof; and wherein the upper and lower endplate structures define docking formations along peripheral edges thereof for engaging the horizontally disposed clamp members in a compressed condition of the fuel cell stack arrangement, the docking formations being configured to define spaces between the endplate structures and the compressing means within which the clamp members are receivable during compression of the fuel cell stack arrangement and whereupon, in use, release of the compressing means causes the clamp members to become captively engaged within the docking formations against recoil pressure of the fuel cell stack arrangement such that the arrangement is held captive in the compressed condition between the clamp members.

Preferably, the fuel cell stack arrangement may be of a generally rectangular cross-sectional shape, defining a pair of opposing long sides and a pair of opposing short sides.

The outer surfaces of the upper and lower endplate structures may be generally planar.

The endplate structures of the fuel cell stack arrangement may be configured such the long sides thereof are thicker in relation to the short sides thereof.

The endplate structures may be manufactured from any suitable metal having sufficient rigidity and strength to withstand expansion of the fuel cell stack arrangement and to ensure uniform distribution of compression pressure to the electrode assembly.

The clamp assembly may be covered with a suitable insulator.

In a preferred embodiment of the invention, the clamp assembly comprises two diametrically opposed pairs of rigid clamping devices, each clamping device defining a pair of spaced apart opposing transversely disposed elongate clamp members interposed at remote ends thereof by vertically disposed support members and wherein the pairs of clamping devices are adapted to engage the long and the short sides of the fuel cell stack arrangement respectively.

The clamping devices may be in the form of rigid rectangular frame-like structures having predefined dimensions.

The pair of clamping devices for engaging the long sides of the fuel cell stack arrangement may have larger dimensions than that of the pair for engaging the short sides of the fuel cell stack arrangement.

Preferably, at least two diametrically opposed docking formations may be defined in the respective short sides of the endplate structures.

The docketing formations may be in the form of step-like recesses.

Corresponding docking formations of the upper and lower endplate structures may generally be configured such that they are in inverted relation to one another.

In a preferred embodiment of the invention, the two pairs of clamping devices are locatable in nested relation to one another at intersecting corners in an assembled condition of the clamp assembly.

The invention may provide for one or more apertures to be formed in the clamp members and one more corresponding apertures formed in the outer surface of the upper endplate structure for receiving fastening elements for securing the clamp members to the upper endplate structure.

The fastening elements may comprise bolts, screws or the like.

The fastening elements may be receivable through the apertures in threadable engagement therewith.

In a preferred embodiment of the invention wherein the two pairs of clamping devices are locatable in nested relation to one another, the apertures of the clamp members overlap at intersecting corners such that the bolt members are receivable through both apertures and wherein the apertures adjacent to the upper endplate structure are not provided with threading.

The compressing means may comprise a machine press.

Further in accordance with the invention, one or more resilient elements may be inserted between the clamp members and the upper endplate structures in order to facilitate generally uniform distribution of compression pressure being applied to the fuel cell stack arrangement.

The resilient element may be in the form of a spring.

The invention may include a delivery mechanism for delivery of fluids and gases between inlet and exhaust apertures defined in the upper endplate structure and respective channels provided therefor in the electrode assembly.

The delivery mechanism may provide for the upper endplate to include one or more generally horizontally extending fluid path formations defined in the upper endplate structure.

Further in accordance with the invention, one or more drainage apertures may be defined in at least one side edge of the upper endplate structure for release of fluids trapped within the delivery mechanism, in which the one or more apertures are in fluid communication with one or more horizontally extending fluid path formations.

According to a second aspect of the invention, there is provided a method of assembling a fuel cell stack arrangement, the fuel cell stack arrangement generally including at least an electrode assembly interposed between an upper current collector and a lower current collector, supportable between operatively upper endplate and lower endplate structures, the method comprising the steps of:

providing a clamp assembly, the assembly comprising at least one clamping device in which the device comprises spaced apart operatively transversely disposed elongate clamp members for engaging outer surfaces of the upper and lower endplate structures respectively along generally peripheral edges thereof, the elongate clamp members being interposed by generally vertically disposed support members in which the length of the support members is greater than the height of the fuel cell stack arrangement in a compressed condition thereof;

forming one or more docking formations along one or more peripheral edges of the endplate structures in which the docking formations are adapted to engage the horizontally disposed clamp members in a compressed condition of the fuel cell stack arrangement;

compressing the fuel cell stack arrangement using compressing means;

inserting the clamp members into spaces defined by the docking formations between the endplate structures and the compressing means;

releasing the compressing means, causing the clamp members to become captively engaged within the docking formations against recoil pressure of the fuel cell stack arrangement such that the arrangement is held captive in the compressed condition between the clamp members.

Preferably, the fuel cell stack arrangement may be of a generally rectangular cross-sectional shape, defining a pair of opposing long sides and a pair of opposing short sides.

The outer surface of the upper and lower endplate structures may be generally planar.

The endplate structures of the fuel cell stack arrangement may be configured such that the long sides are thicker towards generally peripheral edges thereof than the short sides thereof.

The endplate structures may be manufactured from any suitable metal having sufficient rigidity and strength to withstand expansion of the fuel cell stack arrangement.

The clamp assembly may be covered with a suitable insulator.

In a preferred embodiment of the invention, the clamp assembly comprises two diametrically opposed pairs of rigid clamping devices, each clamping device defining a pair of spaced apart opposing transversely disposed elongate clamp members interposed at remote ends thereof by vertically disposed support members and wherein the pairs of clamping devices are adapted to engage the long and the short sides of the fuel stacking structure respectively.

The clamping devices may be in the form of rigid rectangular frame-like structures having predefined dimensions.

The pair of frame-like structures for engaging the long sides of the fuel cell stack arrangement may have larger dimensions than that of the pair for engaging the short sides of the fuel cell stack arrangement.

Preferably, at least two diametrically opposed docking formations may be defined in the respective short sides of the endplate structures.

The docketing formations may be in the form of step-like recesses.

Corresponding docking formations of the upper and lower endplate structures may generally be configured such that they are in inverted relation to one another.

In a preferred embodiment of the invention, the two pairs of clamping devices are locatable in nested relation to one another at intersecting corners in an assembled condition of the clamp assembly.

The invention may provide for one or more apertures to be formed in the clamp members and one more corresponding apertures formed in the outer surface of the upper endplate structure for receiving fastening elements for securing the clamp members to the upper endplate structure.

The fastening elements may comprise bolts, screws or the like.

The fastening elements may be receivable through the apertures in threadable engagement therewith.

In a preferred embodiment of the invention wherein the two pairs of clamping devices are locatable in nested relation to one another, the apertures of the clamp members overlap at intersecting corners such that the bolt members are receivable through both apertures and wherein the apertures adjacent to the upper endplate structure are not provided with threading.

The compressing means may comprise a machine press.

Further in accordance with the invention, one or more resilient elements may be inserted between the clamp members and the upper endplate structures in order to facilitate generally uniform distribution of compression pressure being applied to the fuel cell stack arrangement.

The resilient element may be in the form of a spring.

The invention may include a delivery mechanism for delivery of fluids and gases between inlet and exhaust apertures defined in the upper endplate structure and respective channels provided therefor in the electrode assembly.

The delivery mechanism may provide for the upper endplate to include one or more generally horizontally extending fluid path formations defined in the upper endplate structure.

Further in accordance with the invention, one or more drainage apertures may be defined in at least one side edge of the upper endplate structure for release of fluids trapped within the delivery mechanism, in which the one or more apertures are in fluid communication with one or more horizontally extending fluid path formations.

BRIEF DESCRIPTION OF THE DRAWINGS

These and other features of this invention will become apparent from the following description of one example described with reference to the accompanying drawings in which.

DETAILED DESCRIPTION OF THE INVENTION

Figure 1:
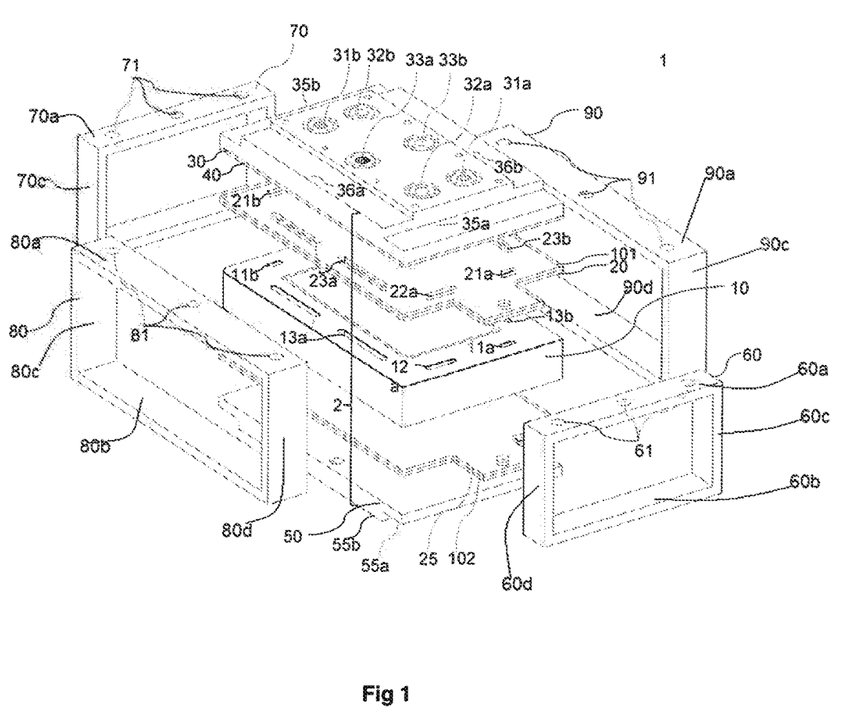
FIG. 1 shows an exploded view of the fuel cell stack clamping assembly of the invention.
Figure 2:
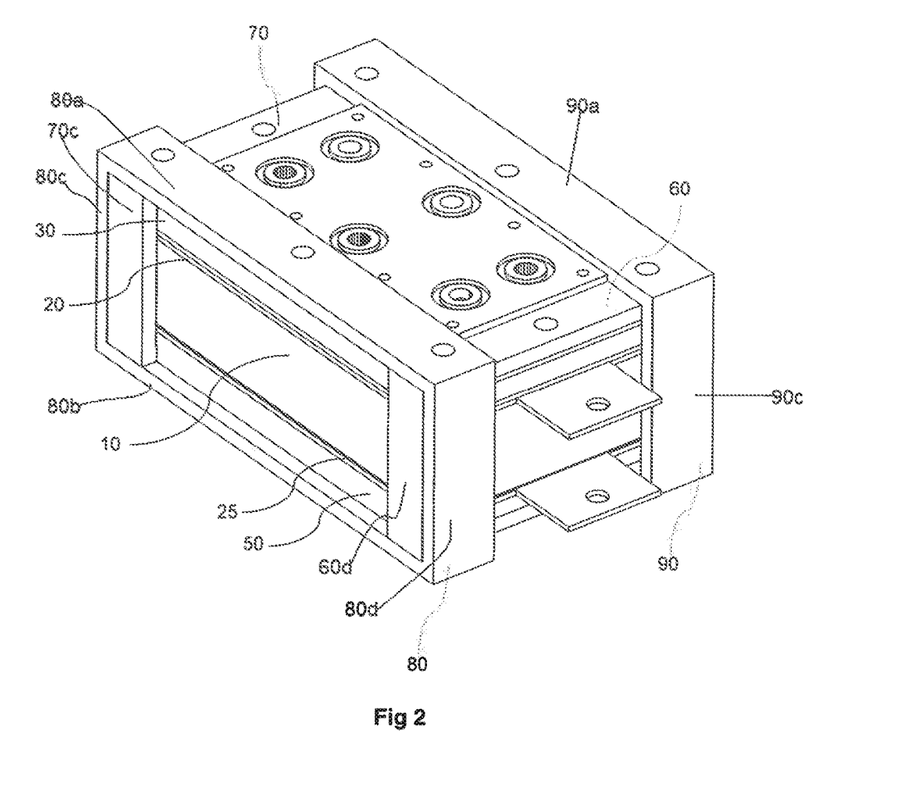
FIG. 2 is a schematic representation of the clamping assembly of FIG. 1 in an assembled condition.

With reference to FIG. 1, a clamp assembly for a fuel cell stack arrangement is designated generally by reference numeral 1. Specifically, the invention provides for a clamp assembly for securing a fuel cell stack arrangement 2 in a compressed condition, the fuel cell stack generally including at least an electrode assembly 10 interposed between an upper current collector 20 and a lower current collector 25, supportable between operatively upper endplate 30 and lower endplate 50 structures.

It is well known that proper thermal and electric contact between components of a fuel cell stack, specifically components of the electrode assembly, is imperative for the performance of the fuel cell stack. Optimal contact is dependent on compression pressure being applied to the stacked components. In this regard, the supporting endplate structures are of particular significance to the application and proper distribution of compression pressure. Whilst clamp devices for securing fuel cell stacks in a compressed condition are known, it is the inventor's contention that there are difficulties associated with these devices. Notably, known devices are not ideally suited to the uniform application and distribution of compression pressure to the fuel cell stack. Further, these devices may be difficult to apply and, once in position, are difficult to adjust, for example for the purpose tightening bolts or other securing elements to reset the compression pressure to accommodate changes in the dimensions of the stacked parts through, for example, thermal expansion, creep or stress relaxation.

With reference to FIG. 1, the clamp assembly of the invention comprises at least one generally rigid clamping device. The clamping device comprising spaced apart operatively transversely disposed elongate clamp members (60a, 60b, 70a, 70b, 80a, 80b, 90a and 90b) for engaging outer surfaces of the upper and lower endplate structures respectively along generally peripheral edges thereof, the elongate clamp members being interposed by generally vertically disposed support members (60c, 60d, 70c, 70d, 80c, 80d, 90c and 90d). A significant feature of the clamp assembly is that the length of the support members is greater than the height of the fuel cell stack arrangement in a compressed condition thereof.

The upper and lower endplate structures define a plurality of docking formations 35a, 35b, 36a, 36b, 55a, 55b, 56a, 56b which take the form of step-like recesses along peripheral edges thereof for engaging the horizontally disposed clamp members in an assembled condition of the clamp assembly. The docking formations are configured in such a way that spaces are defined between the endplate structures and the compressing means the clamp members are slidably receivable within the recesses during compression of the fuel cell stack arrangement using compressing means. When the compressing means is removed and the pressure released, the clamp members become captively engaged within the docking formations against recoil pressure of the fuel cell stack arrangement 2 such that the arrangement is held captive in the compressed condition between the clamp members.

A fuel cell stack 2 generally has a rectangular cross-sectional profile, having two opposed long sides and two opposed short sides. Accordingly, the invention, in a preferred embodiment thereof, provides for the clamp device to comprise two diametrically opposed pairs of rigid clamping devices each clamping device defining a pair of spaced apart opposing transversely disposed elongate clamp members interposed at remote ends thereof by vertically disposed support members and wherein the pairs of clamping devices are adapted to engage the long and the short sides of the fuel cell stacking structure respectively.

Each rigid clamping device generally defines a rectangular frame structure 60, 70, 80, 90 having predetermined dimensions. The pre-set dimensions of the frame structures are generally such that their width is more or less commensurate with that of the stack fuel cell parts but includes a small tolerance margin to accommodate stacking alignment etc. The height of the frame structures is roughly equivalent to that of the stack fuel cell arrangement prior to compression thereof. In the preferred embodiment, the height of the frame structures 60, 70 is generally less than the height of the stacked parts prior to compression thereof and greater than the stacked parts in a compressed condition thereof in order to facilitate application of the clamp assembly. Furthermore, the frame members 80, 90 adapted to engage the generally long sides of the endplate structures have generally thicker peripheral edges that the frame members adapted for engaging the short sides thereof. It will be understood that the long sides of the endplate are more bendable and, for this reason, are required to be thicker in order to prevent bending.

Figure 4:
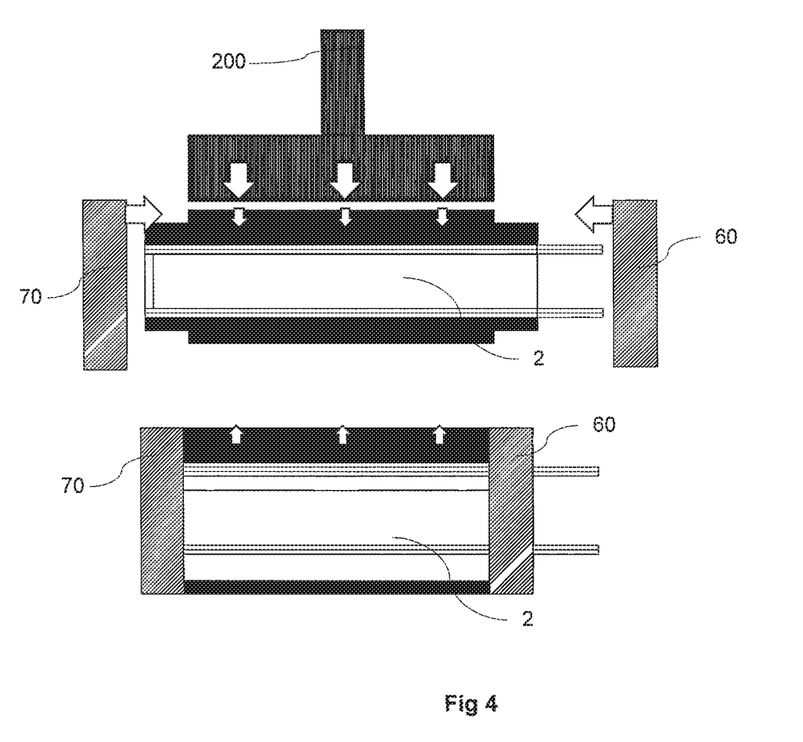
FIG. 4 is a cross-sectional schematic representation showing insertion of the clamping assembly of Figure one during compression of the fuel cell stack arrangement using a machine press.

As shown in FIG. 4, in practice, the fuel cell stack 2 is first compressed using an external pressing device such as a machine press 200. Once the fuel cell stack has been appropriately compressed, the height of the frame structures is greater than that of the compressed stack. Once in the compressed condition, the frame structures may be slid into the docking formations with relative ease. In this regard, it should be noted that the dimensions of frame members 60 and 70 are smaller than those of the frame members 80 and 90 and, thus, the two pairs of frame structures are locatable in nested relation to one another where they intersect at their respective corners. The frame structures being in position, the machine press 200 can be removed, Once removed, the compressed stack arrangement expands in a generally operatively upwards direction against the clamp members causing them to become captively engaged within the docking formations. The spring back action of the stack arrangement is prevented as the stack is arrested between the clamp members thereby retaining the arrangement in the compressed condition. Significantly, the fact that the elongate clamp members extend along the entire peripheral edge of each of the endplates, compression pressure is distributed evenly across the plate and through the stack arrangement. Furthermore, the frame structures are rigid and are manufactured from steel or other suitably strong material and, accordingly, they are able to maintain the compression pressure despite changing dimensions of the fuel cell stack parts as a result of thermal expansion, fluid pressure build-up etc. Furthermore, the clamp assembly and the current collectors are coated with a suitable insulating substance in order to prevent electric current leakage within the stack arrangement.

Figure 3:
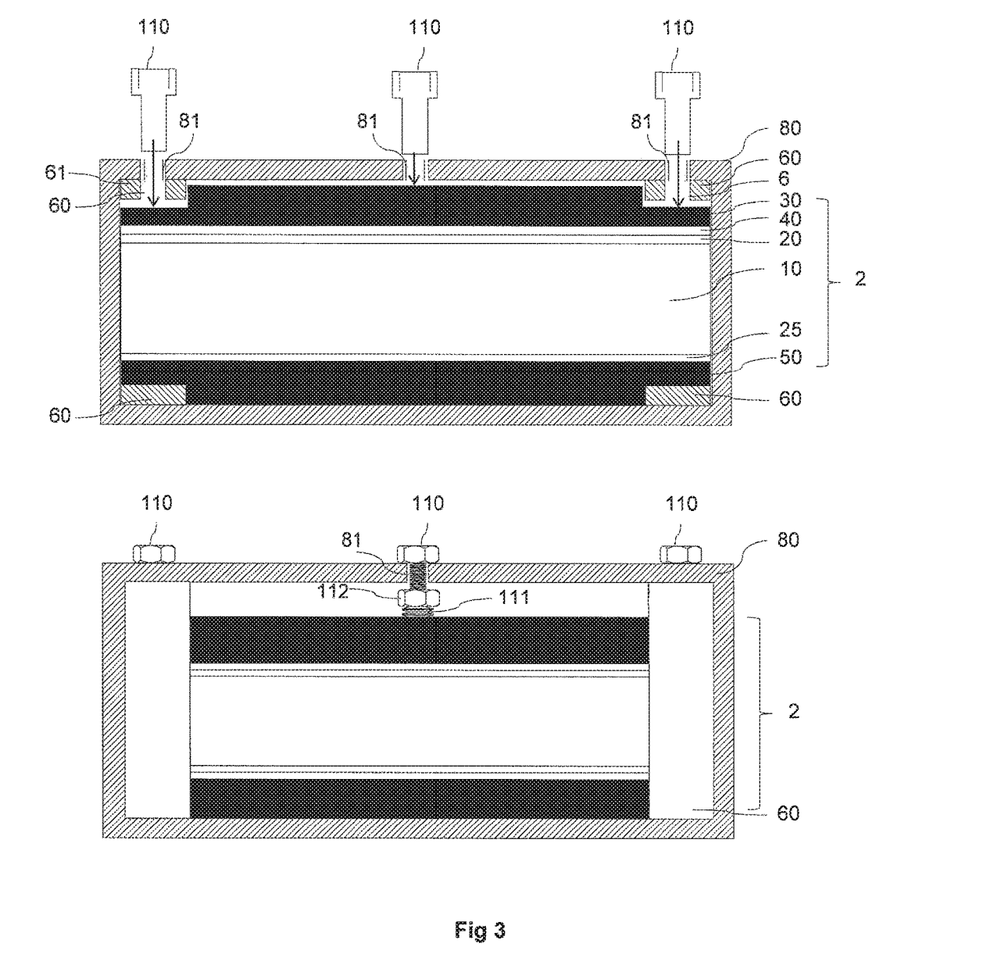
FIG. 3 is cross-sectional schematic representation of the clamping assembly of FIGS. 1 and 2 illustrating the nesting arrangement of the clamp members and the insertion of bolt elements to prevent bending of the clamp assembly due to spring back of the compressed parts of the fuel cell stack arrangement.

Although the use of bolts or other additional fastening elements is not necessary for maintaining the stack arrangement in a compressed condition they may be used, in a preferred embodiment of the invention, in order to provide reinforcement against bending of the clamp devices against spring back of the stacked parts. To this end, the upper clamp members include a plurality of generally horizontally extending apertures 61, 71 for receiving fastening elements, generally in the form of bolts 110, screws or the like. The apertures of the clamp members correspond with like apertures in the surface of the upper endplate structure. The bolts are receivable within the apertures in threadable engagement therewith in order to secure the clamp members to the upper endplate structure. In the preferred embodiment wherein the two pairs of frame members overlap at the corners thereof, the aperture of frame member adjacent to the upper endplate structure is generally not provided with threading and its purpose is merely to guide the bolt to the endplate. One or more resilient elements, such as a spring 111, may be inserted between the clamp members and the upper endplate structures in order to facilitate generally uniform distribution of compression pressure being applied to the fuel cell stack arrangement. The bolts also allow for accurate control of compression pressure in that pressure can be adjusted by tightening the bolts in the event of creep due to changing dimensions of the stack parts. Once the bolt is tightened sufficiently onto the stacked parts, the nut 112 is torqued to compress and fix the spring 111.

Figure 5:
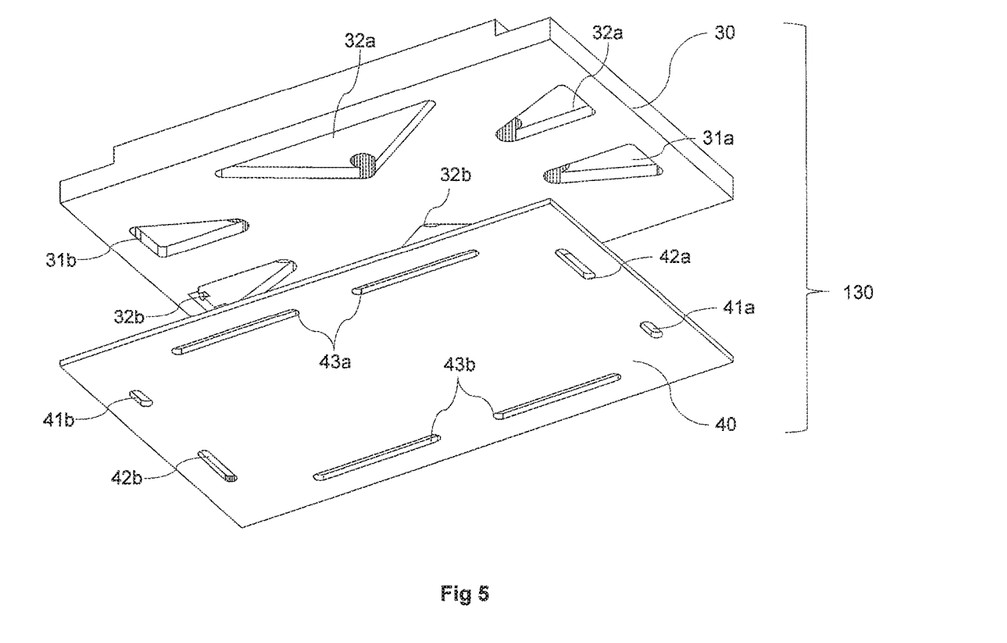
FIG. 5 is an exploded schematic view illustrating the fluid and gas delivery mechanism of the invention.
Figure 6:
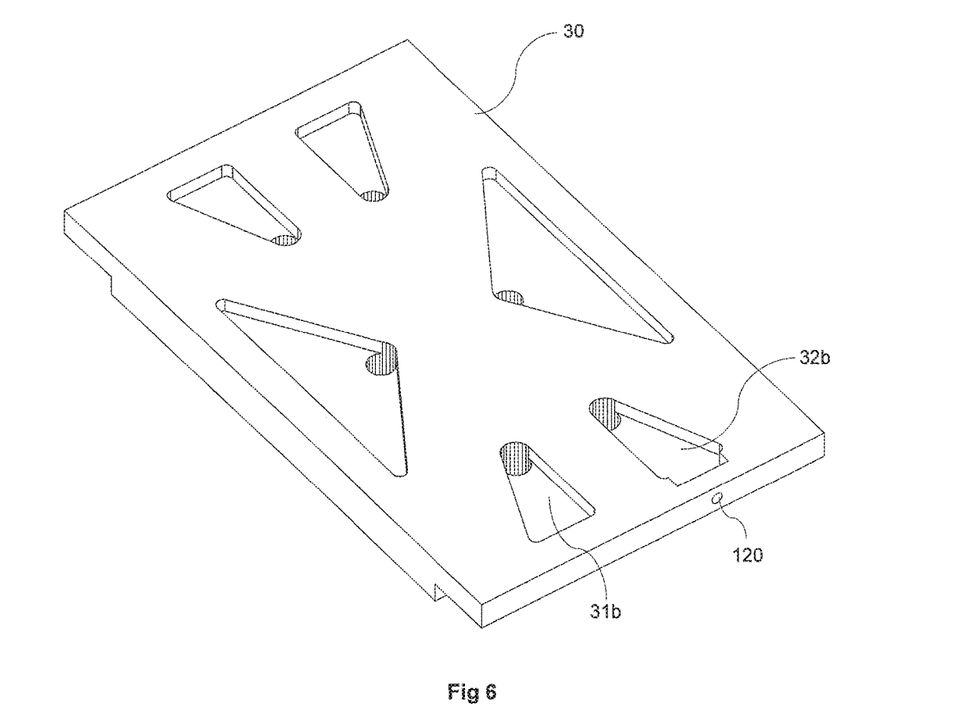
FIG. 6 is a schematic illustration of the delivery mechanism of FIG. 5, showing the drainage aperture for release of trapped by-products resulting from chemical processes taking place within the fuel cell.

Generally, an electrode assembly includes hydrogen channels 11a, 11b air channels 12a, 12b and coolant channels 13a, 13b. Usually, these channels are located towards the outside of the surface area of the electrode in order to maximize the active area thereof. Corresponding inlet 31a, 32a, 33a and exhaust 31b, 32b, 33b apertures are defined in the upper endplate structures. However, due to the fact that the clamp members engage the surfaces or the endplate structures along the periphery thereof covering the channels, direct communication between the channels and the supply and exhaust apertures is frustrated. To this end, as shown in FIG. 5, the clamp assembly includes a connector assembly or delivery system 130 to facilitate communication between the channels and the apertures. The connector assembly includes the upper endplate structure 30 and the upper current collector 40 being sealably fused together, preferably by means of welding. A number of generally horizontally extending fluid paths are formed in the upper endplate structure. Because the fluid path is no longer direct, fluid, generally in the form of water, tends to accumulate within in the connector assembly. Accordingly, the invention provides for one or more drainage apertures 120 to be formed adjacent to the apertures, as shown in FIG. 6. Ideally the drainage aperture is located adjacent to the air exhaust aperture 32b which is where the water is formed as a byproduct of the fuel cell reaction. The drainage aperture removes water from the fuel cell stack.

It is the inventor's contention that the clamp assembly of the invention provides for a means for retaining a fuel cell stack arrangement in a compressed condition that is significantly easier to apply than prior art devices without compromising effectiveness in the application and distribution of compression pressure on the fuel cell stack.

It will be understood that numerous embodiments of the system and methods of the invention are possible without departing from the scope hereof.

The invention claimed is:

1. A clamp assembly for securing a fuel cell stack arrangement in a compressed condition following compression thereof using a compressing apparatus, wherein the fuel cell stack arrangement includes at least an electrode assembly interposed between an upper current collector and a lower current collector; the clamp assembly comprising a first endplate and a second endplate configurable such that the fuel cell stack arrangement is supportable between the first endplate and the second endplate and at least one rigid clamping device, the clamping device comprising:
   a rectangular frame-like structure comprising opposing elongate clamp members for engaging outer surfaces of the first and second endplates respectively along peripheral edges thereof, spaced apart from and connected to one another by perpendicular support members, wherein the length of the support members is greater than the height of the fuel cell stack arrangement in a compressed condition thereof;
   wherein:
   the first and second endplates define docking formations in the form of stepped recesses locatable in inverted relation to one another along peripheral edges thereof for engaging the clamp members in a compressed condition of the fuel cell stack arrangement,
   the docking formations being configured to define spaces between the endplates and the compressing apparatus, the clamp members being receivable within the spaces during compression of the fuel cell stack arrangement and the clamp assembly being configured such that, in use, release of the compressing apparatus causes the clamp members to become captively engaged within the docking formations against recoil pressure of the fuel cell stack arrangement such that the fuel cell stack arrangement is held captive in the compressed condition between the clamp members.

2. A clamp assembly as claimed in claim 1, wherein the clamp assembly is configured for securing a fuel cell stack arrangement having a rectangular cross-sectional shape, defining a pair of opposing long sides and a pair of opposing short sides.

3. A clamp assembly as claimed in claim 2, wherein the endplates are configured such that the long sides thereof are thicker in relation to the short sides thereof.

4. A clamp assembly as claimed in claim 2, wherein the clamp assembly comprises two diametrically opposed rigid rectangular frame-like clamping devices, and wherein the clamping devices are adapted to engage the long and the short sides of the fuel stacking structure respectively.

5. A clamp assembly as claimed in claim 4, wherein the pair of frame-like structures for engaging the long sides of the fuel cell stack arrangement have larger internal dimensions than that of the pair for engaging the short sides of the fuel cell stack arrangement.

6. A clamp assembly as claimed in claim 4, wherein the two pairs of frame-like structures are locatable in nested, relation to one another at intersecting corners in an assembled condition of the clamp assembly.

7. A clamp assembly as claimed in claim 1, wherein the rectangular frame-like structures are rigid.

8. A clamp assembly, as claimed in claim 1, wherein one or more apertures are formed in at least one clamp member being adapted to engage the first endplate and one or more corresponding apertures are formed in the outer surface of the first endplate for receiving one or more fastening elements operable to secure the clamp members to the first endplate.

9. A clamp assembly as claimed in claim 8, wherein the fastening elements comprise bolts or screws.

10. A clamp assembly as claimed in claim 8, wherein the fastening elements are receivable through the apertures in threadable engagement therewith.

11. A clamp assembly as claimed in claim 8, wherein the fastening elements are receivable through the apertures of both of the clamp members at intersecting corners in a nested condition thereof.

12. A clamp assembly as claimed in claim 1, in which one or more resilient elements are insertable between the clamp members and the first endplate, the resilient elements being operable to facilitate uniform distribution of compression pressure being applied to the fuel cell stack arrangement.

13. A clamp assembly as claimed in claim 12, wherein the resilient element is a spring.

14. A clamp assembly as claimed in claim 1, wherein a delivery mechanism is provided for delivery of fluids and gases between inlet apertures and exhaust apertures defined in the first endplate and respective channels provided therefor in the electrode assembly.

15. A clamp assembly as claimed in claim 14, in which the delivery mechanism includes one or more fluid path formations defined in the first endplate, the one or more fluid path formations extending in the second direction.

16. A clamp assembly as claimed in claim 14, in which one or more drainage apertures are defined in at least one side edge of the first endplate for release of fluids trapped within the delivery mechanism, in which the one or more drainage apertures are in fluid communication with one or more fluid path formations extending in the second direction.

17. A method of assembling a fuel cell stack arrangement, the fuel cell stack arrangement including at least an electrode assembly interposed between an upper current collector and a lower current collector, the method comprising the steps of:

providing a clamp assembly, the clamp assembly comprising a first and a second endplate configured such that the fuel cell stack arrangement is supportable between the first endplate and the second endplate:

at least one clamping device, the clamping device comprising:

a rectangular frame-like structure comprising opposing elongate clamp members for engaging outer surfaces of the first and second endplates respectively along peripheral edges thereof, spaced apart from one another by perpendicular support members, wherein the length of the support members is greater than the height of the fuel cell stack arrangement in a compressed condition thereof;

forming one or more docking formations in the form of stepped recesses along one or more peripheral edges of the endplates wherein the docking formations are adapted to engage the clamp members, in a compressed condition of the fuel cell stack arrangement;

aligning corresponding docking formations of the first and second endplates in inverted relation to one another;

compressing the fuel cell stack arrangement with a compressing apparatus;

inserting the clamp members into spaces defined by the docking formations between the endplates and the compressing apparatus; and releasing the compressing apparatus, causing the clamp members to become captively engaged within the docking formations against recoil pressure of the fuel cell stack arrangement such that the arrangement is held captive in the compressed condition between the clamp members.

* * * * *